United States Patent [19]

Maldonado et al.

[11] 4,145,322

[45] Mar. 20, 1979

[54] PROCESS FOR PREPARING BITUMEN-POLYMER COMPOSITIONS

[75] Inventors: Paul Maldonado, Saint Symphorien d'Ozon; Jean Mas, Chaponnay; Trung K. Phung, Vienne, all of France

[73] Assignee: Elf Union, Paris, France

[21] Appl. No.: 865,245

[22] Filed: Dec. 28, 1977

[30] Foreign Application Priority Data

Dec. 28, 1976 [FR] France .............................. 76 39233

[51] Int. Cl.² .......................................... C08L 91/00
[52] U.S. Cl. .............................. 260/28.5 AS; 428/489
[58] Field of Search ................................ 260/28.5 AS

[56] References Cited

U.S. PATENT DOCUMENTS

| | | | |
|---|---|---|---|
| 3,634,293 | 1/1972 | Bonitz et al. | 260/28.5 AS |
| 3,803,066 | 4/1974 | Petrossi | 260/28.5 AS |
| 3,963,659 | 6/1976 | Binder et al. | 260/28.5 AS |
| 3,992,340 | 11/1976 | Bonitz | 260/28.5 AS |

*Primary Examiner*—Melvyn I. Marquis
*Attorney, Agent, or Firm*—Burgess, Ryan and Wayne

[57] ABSTRACT

The present invention is related to a novel process for preparing bitumen-polymer compositions. These compositions contain block copolymers comprising diene and styrene groups.

The compositions present excellent mechanical properties even at low temperatures.

18 Claims, No Drawings

PROCESS FOR PREPARING BITUMEN-POLYMER COMPOSITIONS

The present invention is related to a novel process for preparing bitumen-polymer compositions containing sequential block copolymers comprising diene and styrene groups; it also relates to the compositions thus obtained.

The bitumens must exhibit a certain number of specific mechanical properties with a view to being used in their various fields of application, especially when said bitumens are used as binders for superficial coats (road bitumens) or as industrial bitumens. These properties are defined by various tests, among which the following tests may be cited:

determining the softening point by the Ring and Ball test (French Standard NFT 66 008), determining the breaking or Fraass point according to the Standard IP 80/53, determining the penetration value according to the Standard NFT 66 004, determining the rheological tensile characteristics:
tensile strength threshold $\sigma_s$ in bars,
threshold extension $\epsilon_s$ in %,
breaking tensile strength $\sigma_r$ in bars,
breaking extension $\epsilon_r$ in %,
measured according to the Standard NFT 46 002.

The conventional bitumens do not, generally speaking, meet all these requirements simultaneously, and it has long ago been proposed to add to the conventional bitumens, products, especially polymers, with a view to improving the mechanical properties of these bitumens. The added polymers or copolymers, which are often called elastomers, are high molecular weight substances, the molecular weight of which is higher than 100 000.

The added elastomers usually improve the mechanical properties of the bitumens, especially their elasticity. However, the majority of elastomers usually give rise to solubility problems. This occurs especially during stockage of the compositions since they tend to separate into phases which in turn results in the loss of the good initial mechanical properties of the bitumen-polymer.

As an example of the type of elastomers used in the bitumen compositions one may cite polyisoprene, butyl rubber, polybutenes, polystyrene/butadiene rubber, ethylene/vinyl acetate copolymers, etc... Among these elastomers, styrene and butadiene based copolymers are known for their efficiency. They are in fact quite soluble in bitumen and confer on it very good mechanical properties (visco-elasticity).

However, the bitumens, especially road bitumens are constantly subjected to severe thermal stresses, and all the bitumen-polymer compositions known up to now lose their good mechanical properties especially when they are used at temperatures well below 0° C.

The aim of the present invention is to overcome these drawbacks and to offer a process of preparation of novel bitumen-polymer compositions containing block copolymers comprising diene and styrene groups having excellent mechanical properties even at low temperatures.

The aim of the present invention is a process for preparing a bitumen-polymer composition which comprises contacting with each other, at a temperature between 130° and 230° C., 80 to 98% by weight of a bitumen presenting a penetration value between 30 and 220, and 20 to 2% by weight of a block copolymer, with an average molecular weight between 30 000 and 300 000 having the theoretical formula $S_x - B_y$ in which:

S corresponds to the styrene structure groups,
B corresponds to the conjugated diene structure groups,
x and y are integers,
stirring the obtained mixture for at least two hours, then adding 0.1 to 3% by weight of sulphur with respect to the bitumen and maintaining the mixture thus obtained under agitation for at least 20 minutes.

All bitumens and natural and synthetic asphalts, possibly air or steam blown can be used as the bitumen-polymers of the invention. The choice of the degree of penetration will depend essentially on the particular application for which the bitumen-polymer is to be used.

The copolymers used in the process according to the invention are block copolymers comprising styrene groups and conjugated diene groups. For example, the conjugated diene groups can be, among others, butadiene and isoprene. Needless to say the copolymer can contain several different conjugated diene groups.

The mixing of the styrene-diene block copolymer and the bitumen takes place under conditions which assure an excellent homogeneity. The temperature is usually between 130° and 230° C. so that the components are sufficiently fluid. Furthermore, the mixture must be maintained under agitation for at least two hours, and preferably more than three hours, in order to assure complete solubilization of the copolymer by the bitumen. This step is usually limited to five hours for obvious economic reasons although theoretically there is no superior time limit.

According to the process of the invention, conjugated dienes and styrene block copolymers may be used, which have an average molecular weight between 30 000 and 300 000 and preferably between 70 000 and 200 000.

In the process according to the invention, di-, tri- or polyblock copolymers may be used. Generally speaking it is usually preferably to use tri- or poly- block copolymers if their average molecular weight is high, that is to say, for example, at least equal to 120 000, and di-block copolymers if their average molecular weight is relatively low, for example, between 30 000 and 120 000.

These copolymers are products which are known to a man skilled in the art and in certain cases are already marketed. Thus it is unnecessary to give a more detailed description of them in the present application. However, it may be stated that the copolymers usually have a styrene content between 10 and 60% and preferably between 15 and 30% (by weight) and a conjugated diene content between 40 and 90% and preferably between 70 and 85% (by weight).

In the process according to the invention, the sulphur is added when the mixture is homogenized. The sulphur, which is added, is not chemically bound so that it will react with the components of the mixture. The sulphur, used in the process according to the invention, may be, for example, sulphur flower, pulverulent sulphur, melted sulphur, etc... The quantity of sulphur added is small and is usually between 0.1 and 3% by weight and preferably between 0.1 and 1.5% by weight with respect to the bitumen. After addition of the sulphur, the mixture is stirred for a time sufficient to allow the said sulphur to react with the components. This usually does not take very long; normally 20 to 90 minutes are sufficient, the initial temperature of the mixture is also maintained.

The precise nature of the sulphur's action on the bitumen and the conjugated diene styrene copolymer can still not be completely defined. However, this action is rather similar to that of vulcanization. The action of the sulphur causes a modification in the structure of the mixture which leads to the obtention of bitumen-polymers having thermally stable and improved mechanical properties. It is important that the mixture be homogeneous before adding the sulphur since if the sulphur is added prematurely it can cause a setting-cross-linking of the copolymers- which is a very fast vulcanization of the components of the mixture, and lead to an unusable heterogeneous bitumen-polymer.

The invention not only deals with the preparation of the bitumen-polymers but also concerns the improved bitumen-polymers resulting from the above process.

These bitumen-polymers may, of course, be used as bitumens for road-coating (road-coating bitumens) due to their thermally stable mechanical properties. These bitumen-polymers also exhibit a strong elasticity, a high plasticity interval, which means that they may also be used to advantage in the manufacture of industrial coating (coatings, superficial coats, asphalt covers) or for industrial applications such as tightness: coverings, felts, shingles, paints, products for the protection of car bottoms.

The following non-limiting examples serve to better illustrate the invention.

lar weight of 150 000, the butadiene/styrene ratio (by weight) of which is equal to 70/30.

The characteristics of the bitumen obtained are given in Table 1.

The bitumen-polymer of present Example 4 is obtained according to the process of Example 1, by mixing 100 parts of an 80–100 bitumen, 5.27 parts of the copolymer used in Example 3, and by adding, after three and a half hour under stirring, 0.2 parts of sulphur instead of 0.5.

The characteristics of the bitumen obtained are given in Table 1.

The bitumen-polymer of comparative Example 5 is obtained in the same manner as that of Example 4 but without the addition of sulphur. (mixing time 4 hours).

The characteristics of the bitumen obtained are given in Table 1.

The bitumen-polymer of Example 6 was prepared by mixing, at 190° C., on the one hand, 90 parts of a 40–50 bitumen having a Ring and Ball temperature of 52° C., a penetration value of 50 and a Fraass point of −12° C. and, on the other hand, 10 parts of a styreneisoprene di-block copolymer having an average molecular weight of 130 000 and an isoprene/styrene ratio (by weight) equal to 83/17.

After three hours of mixing, under stirring, 0.2 parts of sulphur flower is added, the stirring being maintained for 45 minutes at 170° C.

The characteristics of the bitumens obtained are given in Table 1.

TABLE 1

| Characteristics | | | | Tensile Tests | | | | | | | | | | | |
|---|---|---|---|---|---|---|---|---|---|---|---|---|---|---|---|
| | | | | +20° C. 500mm/mn | | | | −10° C. 10mm/mn | | | | −10° C. 500mm/mn | | | |
| Ex. No. | $p^1$ | Test R &B$^2$ ° C. | Fraass Point ° C. | $\sigma_s$ bars | $\sigma_r$ bars | $\epsilon_s$ % | $\epsilon_r$ % | $\sigma_s$ bars | $\sigma_r$ bars | $\epsilon_s$ % | $\epsilon_r$ % | $\sigma_s$ bars | $\sigma_r$ bars | $\epsilon_s$ % | $\epsilon_r$ % |
| 1 | 31 | 89 | <−32 | 1.96 | 2.07 | 125 | >700 | 8.78 | 12.15 | 30 | 480 | 29.2 | 26.8 | 87.5 | 325 |
| 2 | 30 | 75 | −20 | 4.14 | 0.18 | 30 | 230 | 14.2 | 8.7 | 17.5 | 72 | 15.3 | 11.4 | 6.5 | 10 |
| 3 | 38 | 92.5 | −14 | 3.5 | 3.7 | 35 | >750 | — | 15.4 | — | 4.5 | — | — | — | 2.7 |
| 4 | 32 | 85 | −21 | 1.65 | 2.3 | 30 | >700 | 32.6 | 20.3 | 11 | 325 | not measured | | | |
| 5 | 33 | 66 | −19 | 1.75 | 0.6 | 30 | >700 | — | 25.8 | — | 8 | | | | |
| 6$^3$ | 36 | 68 | −18 | 3.25 | 0.1 | 18 | >700 | not measured | | | | | | | |

— = fragile and non-measurable
$^1$P = penetration value
$^2$R & B = Ring and Ball
$^3$ = tensile test carried out at 250mm/mn

EXAMPLES 1 to 5

The bitumen-polymer of Example 1 was prepared by mixing, at 170° C., on the one hand, 100 parts of an 80–100 bitumen having a Ring and Ball temperature of 48° C. and a Fraass point of −18° C., and on the other hand, 10 parts of a butadiene-styrene di-block copolymer having an average molecular weight of 75 000 and a butadiene/styrene ratio equal to 75/25 (by weight).

After mixing, under stirring, for three and a half hours, one adds 0.5 parts of sulphur (sulphur flower), the stirring being maintained for half an hour.

The characteristics of the bitumen obtained are given in Table 1.

The bitumen-polymer of comparative Example 2 is obtained in the same manner as that of Example 1 but without the addition of sulphur, and is mixed under stirring for four hours.

The characteristics of the bitumen obtained are given in Table 1.

The bitumen-polymer of comparative Example 3 is obtained in the same manner of Example 2 but substituting however the butadiene-styrene copolymer, having an average molecular weight of 75 000 by a butadiene-styrene tri-block copolymer, having an average molecu- All these characteristics were measured according to the standards given in the description.

The comparison of Examples 1 and 2 shows that the bitumen-polymer, obtained according to the process of the invention (Example 1) is far superior to the bitumen-polymer of Example 2, although the bitumen-polymer of Example 2 already exhibits excellent mechanical properties. In point of fact, the bitumen-polymer of Example 1 is better with respect to the conventional properties (Ring and Ball test and Fraass Point); however the said bitumen-polymer of Example 1 exhibits higher tensile properties. The bitumen of Example 1 may be considered as having an elastic tensile profile whilst the bitumen of Example 2 has an essentially viscous tensile profile. It must be noted that the elastic properties are preserved at low temperatures. ($\epsilon_r$ = 325% at −10° C. and for a tensile speed of 500mm/mn).

The bitumen-polymer of Example 3 is superior to that of Example 2. It presents a visco-elastic tensile profile due to the fact that the average molecular weight is higher than that of the copolymer which is used. However, it must be noted that at low temperatures (−10° C.) the bitumen-polymer looses all its elasticity. It becomes brittle, therefore it is impossible to measure the other properties at low temperatures.

The comparison of Examples 4 and 5 shows that the use of the copolymer of Example 3 in the process of the invention leads to an excellent bitumen-polymer. In fact, although the tensile properties are not measured at −10° C. and 500mm/mn, a very clear improvement can be observed in comparison with the tensile characteristics at −10° C. and 10mm/mn which are beyond compare with respect to the results obtained from a simple copolymer bitumen mixture.

Certain values, especially those concerning the mechanical characteristics at the maximum strength threshold, are not shown in the table. This is due to the fact that, under the experimental conditions used, the tested bitumen-polymer is fragile and thus breaks before it reaches the maximum tensile strength; in certain extreme cases (−10° C., 500mm/mn), the breaking occurs at the beginning of the tensile strength test without it being possible to determine a significant characteristic.

The polymer-bitumen of Example 6 was prepared for an industrial application (tightness) whereas the bitumens of the preceding Examples were prepared for road applications.

What is claimed is:

1. A process for obtaining a bitumen-polymer composition which consists in contacting with each other, at a temperature between 130° and 230° C., 80 to 98% by weight of a bitumen exhibiting a penetration value between 30 and 220, and 2 to 20% by weight of a block copolymer, with an average molecular weight between 30,000 and 300,000 having the theoretical formula $S_x - B_y$ in which:

S corresponds to the styrene structure groups,
   B corresponds to the conjugated diene structure groups,
   x and y are integers, stirring the obtained mixture for at least two hours, then adding 0.1 to 3% by weight of elemental sulphur with respect to the bitumen and maintaining the mixture thus obtained under agitation for at least 20 minutes.

2. A process according to claim 1, characterized in that the block copolymer has a molecular weight between 70,000 and 200,000.

3. A process according to either claim 1, characterized in that the block copolymer is di-block copolymer.

4. A process according to either claim 1, characterized in that the block copolymer is a tri-sequential or tri- or polyblock copolymer.

5. A process according to claim 1, characterized in that the block copolymer contains 10 to 60% by weight of styrene groups.

6. A process according to claim 5, characterized in that the block copolymer contains 15 to 30% by weight of styrene groups.

7. A process according to claim 1 characterized in that the conjugated diene is butadiene, isoprene or mixtures thereof.

8. A process according to claim 1, characterized in that the conjugated diene is isoprene.

9. Bitumen-polymer compositions characterized in that they are obtained according to the process of claim 1.

10. A bitumen-polymer composition comprising 80 to 98% by weight of a bitumen having a penetration value between 30 and 220, and 2 to 20% by weight of a block copolymer, with an average molecular weight between 30,000 and 300,000 having the theoretical formula $S_x - B_y$ in which:

S corresponds to the styrene structure groups,
    B corresponds to the conjugated diene structure groups and
    x and y are integers, and 0.1 to 3% by weight of sulphur.

11. A composition according to claim 10 wherein the block copolymer has a molecular weight between 70,000 and 200,000.

12. A composition according to claim 10 wherein the block copolymer is a di-, tri- or polyblock copolymer.

13. A composition according to claim 12 wherein the molecular weight of the tri-block or polyblock copolymer is at least 120,000.

14. A composition according to claim 12 wherein the molecular weight of the di-block copolymer is between 30,000 and 120,000.

15. A composition according to claim 10 wherein the block copolymer contains 10 to 60% by weight of styrene groups.

16. A composition according to claim 10 wherein the block copolymer is a butadiene-styrene di-block copolymer with a butadiene/styrene ratio of 70/25, by weight.

17. A composition according to claim 10 wherein the block copolymer is a tri-block butadiene-styrene copolymer with a butadiene/styrene ratio of 70/30, by weight.

18. A composition according to claim 10 wherein the block copolymer is a di-block styrene-isoprene copolymer with an isoprene/styrene ratio of 83/17, by weight.

* * * * *